(12) United States Patent
Mese et al.

(10) Patent No.: US 10,061,509 B2
(45) Date of Patent: Aug. 28, 2018

(54) KEYPAD CONTROL

(71) Applicant: Lenovo (Singapore) Pte. Ltd., Singapore (SG)

(72) Inventors: John Carl Mese, Cary, NC (US); Russell Speight VanBlon, Raleigh, NC (US); Nathan J. Peterson, Durham, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 173 days.

(21) Appl. No.: 14/510,962

(22) Filed: Oct. 9, 2014

(65) Prior Publication Data

US 2016/0103605 A1   Apr. 14, 2016

(51) Int. Cl.
G06F 3/0488 (2013.01)
G06F 3/044 (2006.01)
G06F 3/01 (2006.01)
G06F 3/03 (2006.01)

(52) U.S. Cl.
CPC .......... *G06F 3/04886* (2013.01); *G06F 3/013* (2013.01); *G06F 3/017* (2013.01); *G06F 3/0304* (2013.01); *G06F 3/044* (2013.01); *G06F 2203/04804* (2013.01)

(58) Field of Classification Search
CPC .... G06F 3/04886; G06F 3/0425; G06F 3/046; G06F 3/013
See application file for complete search history.

(56) References Cited

U.S. PATENT DOCUMENTS

| | | | | |
|---|---|---|---|---|
| 5,638,501 A * | 6/1997 | Gough | ............... | G06F 3/0481 345/639 |
| 6,538,660 B1 * | 3/2003 | Celi, Jr. | ............... | G09G 5/14 345/592 |
| 7,515,135 B2 * | 4/2009 | Varanda | ............... | G06F 3/0481 345/156 |
| 8,902,198 B1 * | 12/2014 | Karakotsios | ........... | G06F 3/017 345/175 |
| 9,041,660 B2 * | 5/2015 | Markiewicz | .......... | G06F 3/0488 345/173 |
| 9,207,852 B1 * | 12/2015 | Zhou | ............... | G06F 3/0488 |
| 2008/0012835 A1 * | 1/2008 | Rimon | ............... | G06F 3/038 345/173 |
| 2010/0323762 A1 * | 12/2010 | Sindhu | ............... | G06F 1/1613 455/566 |
| 2012/0086645 A1 * | 4/2012 | Zheng | ............... | G06F 3/013 345/168 |
| 2014/0195957 A1 * | 7/2014 | Bang | ............... | G06F 3/04812 715/773 |
| 2014/0240260 A1 * | 8/2014 | Park | ............... | G06F 3/0488 345/173 |

(Continued)

OTHER PUBLICATIONS www.opengl.org, OpenGL FAQ / 15 Transparency, Translucency, and Using Blending, 2014 (3 pages).

*Primary Examiner* — Mihir K Rayan
(74) *Attorney, Agent, or Firm* — Brian J. Pangrle

(57) ABSTRACT

An apparatus can include a processor; memory accessibly by the processor; a display operatively coupled to the processor; an object detector operatively coupled to the processor; and display circuitry that controls transparency of a rendered keyboard based at least in part on input sensed via the object detector.

17 Claims, 11 Drawing Sheets

(56) References Cited

U.S. PATENT DOCUMENTS

2015/0095833 A1* 4/2015 Kim .................... G06F 3/04886
715/773
2015/0331605 A1* 11/2015 Park ..................... G06F 3/0482
715/773

* cited by examiner

KEYPAD CONTROL

TECHNICAL FIELD

Subject matter disclosed herein generally relates to displayable keypads.

BACKGROUND

A touchscreen display may render a keypad such as a keyboard, a numeric keypad, etc. As an example, a touchscreen display may be part of a phone, a tablet computing device, a notebook computing device, etc.

SUMMARY

An apparatus can include a processor; memory accessibly by the processor; a display operatively coupled to the processor; an object detector operatively coupled to the processor; and display circuitry that controls transparency of a rendered keyboard based at least in part on input sensed via the object detector. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
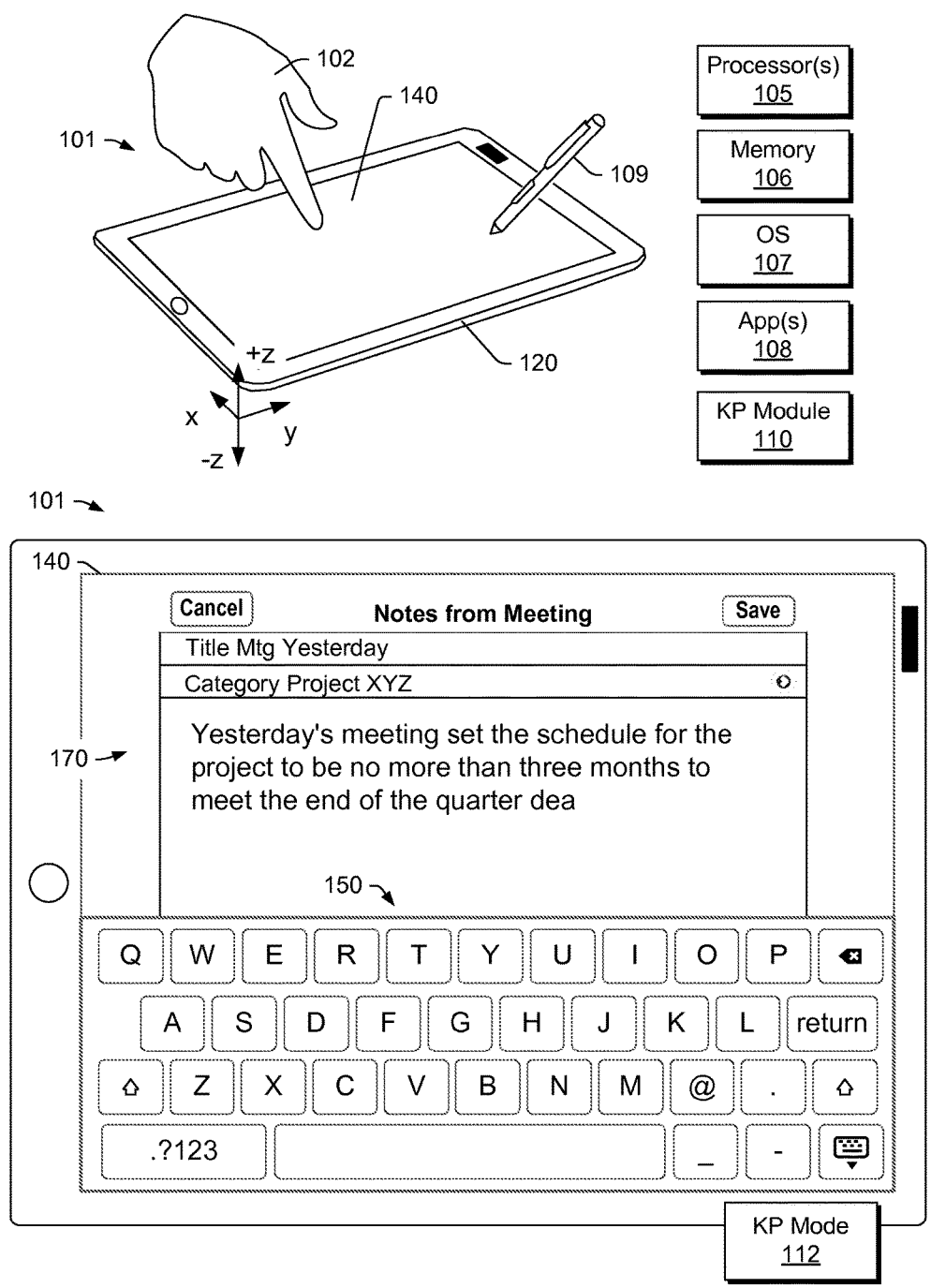
FIG. 1 is a diagram of an example of a device.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, an on-screen keyboard may obscure content on devices, particularly where a display may be limited in size. For example, a keyboard may be of a size sufficient for use via touching by a finger or fingers or by a stylus and occupy a portion of the display where the portion may be a larger percentage of a display's area with respect to decreasing display size. Such a scenario may frustrate a user as the user may have to enter commands (e.g., gestures, etc.) to keep altering what is being displayed. For example, when a user is answering a question (e.g., or filling out a form), the keyboard may cover: (i) the question he or she is attempting to answer, (ii) the field into which a user is entering text, and/or (iii) the button confirming the entry.

As an example, a scenario may arise where a user must minimize or close an on-screen keyboard to see the content "underneath". Or, for example, a scenario may arise where a user can dock a keyboard to one side leaving a narrow portion of a display for rendering of content. However, such a scenario too may be less than optimal.

As an example, a method can include making transparency of an on-screen keyboard dynamic. For example, if a user's hands are hovering over or approaching a display, a device may render a keyboard in a readily visible state. And, for example, if the user lift's her hand(s), the on-screen keyboard may become transparent to an extent that the user can see content that would otherwise be obscured (e.g., while the on-screen keyboard may still be rendered at a transparency level that indicates its presence).

As an example, object detection may include more than just up/down, for example, to account for side/tilting motion or motion towards a user's body (e.g., or away from a user's body). As an example, a gesture may be in a gesture library of a device such that a user can "peek" underneath a keyboard to check for or see content. In such an example, the device may implement a "peek" mode, optionally while a user maintains contact with an on-screen keyboard (e.g., a keyboard rendered to a touch sensitive display or touchscreen). For example, consider a user touching a portion of a display that has rendered keyboard while the user uses a finger to swipe at a corner or an edge of the keyboard to cause a change in transparency of at least a portion of the keyboard.

As an example, a user may touch a portion of a display that has a rendered keyboard while the user hovers a finger over a portion of the keyboard such that a region of the keyboard (e.g., underneath the finger, adjacent to the finger, etc.) changes in its transparency level. In such an example, a device may determine that a user is positioned to one side of the device and approximate a viewing angle of the user, for example, to cause a portion of a keyboard to the front of a finger to change its transparency and become more transparent (e.g., so the user may see content "underneath" the keyboard.

As an example, translucency of a keyboard may depend on content that may be "underneath" at least a portion of the keyboard. For example, if content (e.g., pictures, video and/or text) exists underneath the keyboard, a configurable maximum amount of keyboard translucency may be set so that the user can still partially see through the keyboard as long as the content exists underneath the keyboard. As another example, a device may implement eye tracking to determine if a user reaches an end of viewable content that may be an end blocked by a portion of a keyboard (e.g. reading text and the end of the text is blocked by a border of a keyboard, etc.). In such an example, if more content exists "underneath" the keyboard, when the user attempts to view it, the device may control rendering of the keyboard (e.g., via input from an eye tracker) and make it more transparent.

As an example, a device may implement eye tracking that may follow one or more of a user's eyes. In such an example, as the user moves his eye or eyes along a rendered keyboard, a particular spot may become more translucent so that the user can see through that region of the keyboard more than the another region or regions of the keyboard (e.g., akin to x-ray vision).

FIG. 1 shows an example of a device 101 that may operate in one or more keypad modes. In FIG. 1, the device 101 is illustrated along with a Cartesian coordinate system that includes x, y and z axes. Various features of the device 101 may be described with respect to the Cartesian coordinate system. For example, length (e.g., along a y-axis), width (e.g., along an x-axis), elevation/depth (e.g., along a z-axis), aspect ratios, areas, relationships between features, etc. may be described with respect to the Cartesian coordinate system. In the example of FIG. 1, a hand 102 is illustrated, however, the size of the hand 102 and the size of the device 101 (e.g., in relationship to the hand 102) may be other than as illustrated.

In FIG. 1, the device 101 includes one or more processors 105, memory 106, an operating system 107 (e.g., or operating systems), one or more applications 108, an optional stylus 109 and a keypad module 110. The device 101 can include a housing 120 and a display 140. As an example, the display 140 may be a touch-sensitive display (e.g., a touchscreen display). Such a display may include or be operatively coupled to circuitry that senses touch via a finger of the hand 102, the stylus 109, etc., for example, to input information such as, for example, commands, selections, digital ink, etc.

As an example, an operating system environment may be established by executing instructions of the operating system 107 stored in the memory 106 of the device 101 using at least one of the one or more processors 105. In such an example, the operating system environment may call for rendering information to a display, receiving and processing input from a surface using a stylus, a finger, etc. As an example, an application may be executable in an established operating system environment, for example, to provide for rendering information to the display 140.

In FIG. 1, the display 140 of the device 101 may include a LCD flat panel display with associated LCD driver circuitry. While LCD may be an acronym for "liquid crystal display", LCD finds uses as "LCD display", for example, as an adjective for "display" (e.g., a type of display). In FIG. 1, the display 140 may employ one or more other technologies, for example, consider technologies such as LED, plasma, etc.

As to a touch-sensitive display or touchscreen, the device 101 may include hardware for capacitive, resistive, acoustic, optical, embedded or one or more other "touch" technologies. As an example, a capacitive touchscreen may include circuitry for projected capacitance, surface capacitance, etc. Touch technology may include circuitry for sensing voltage, current, ultrasonic waves, capacitance change, light, images, force, etc. As an example, multi-touch may be defined as the ability for a touchscreen to recognize two or more simultaneous touch points.

As an example, a touch-sensitive display may include a drive electrode and a receive electrode. In such an example, charge may be provided to the drive electrode such that an electric field is formed with respect to the receive electrode. The electric field may be referred to as a "projected" electric field, for example, that corresponds to a technology known as "projected capacitance" (e.g., "p-cap"). A projected electric field may be available for "field coupling" by introduction of a conductive object (e.g., a finger of a hand, etc.) where a portion of the projected electric field couples with the conductive object, which leaves a remaining portion of the projected electric field coupling with the receive electrode. In such an example, the field coupling with the conductive object acts to reduce charge collected by the receive electrode. In turn, the collected charge may be used as an indicator of the conductive object being at or near a particular surface location on the display 140 (e.g., a particular x,y location in an x,y-plane). As an example, an area of "contact" may be determined.

In FIG. 1, the display 140 may optionally include an electromagnetic digitizer panel and electromagnetic digitizer circuitry. In such an example, energy may be induced in a resonant circuit of the stylus 109 by a field generated by the electromagnetic digitizer panel. The resonant circuit of the stylus 109 then makes use of this energy to return a signal to the electromagnetic digitizer panel where input signals may determine, for example, one or more of coordinate position, angle, speed, writing pressure, etc. As an example, an electromagnetic digitizer panel may include a sheet manufactured from glass epoxy resin or from a polyimide and PET formed film in which a large number of overlapping loop coils are arranged in a matrix in the x and y axis directions.

As illustrated in FIG. 1, the device 101 may operate in a keypad mode 112 (KP mode), for example, as one of one or more modes of the keypad module 110. In the keypad mode 112, the device 101 may render a keypad 150 to the display 140 where touch input (e.g., via finger, stylus, etc.) that corresponds to an individual key of the keypad 150 can cause the device 101 to register a corresponding character (e.g., a symbol, an alphanumeric character, etc.). For example, one of the one or more applications 108 may be or include a text application (e.g., a note pad, a word processor, etc.) where text may be entered along with other information, commands, etc. via a keypad such as the keypad 150. In the example of FIG. 1, an application graphical user interface 170 is shown as being rendered to the display 140 where text in the GUI 170 may be text entered via the keypad 150 (e.g., via user touches to the display).

In computing, a keypad can be a keyboard (e.g., a typewriter-style keyboard in terms of layout as to characters). Such a keyboard can include an arrangement of graphically displayed buttons or keys that are touch sensitive or, for example, stylus sensitive. As an example, a touch-sensitive display (e.g., a touchscreen) may include circuitry that can detect "presence" of a stylus (e.g., an active stylus or a passive stylus), a finger, etc. For example, such a display may detect hovering of an object that may be proximate to a surface of the display.

A keyboard can include one or more characters rendered to an individual key where, for example, selection of a key can correspond to a single symbol. As an example, to produce some symbols, selecting several keys simultaneously or in sequence may be performed. A keyboard can include keys that produce letters, numbers or signs (characters), other keys or simultaneous key presses may produce actions or execute commands.

As an example, a keyboard may be a graphically rendered graphical user interface (GUI) for input of alphanumeric data into a computing device. As an example, a keyboard may be used to type text and numbers into a word processor, text editor or other program.

As an example, a keyboard may include an arrangement of keys that corresponds to a layout. For example, consider a QWERTY layout, which is part of the 104-key PC US English QWERTY keyboard layout as evolved from the standard typewriter keyboard (e.g., optionally with extra keys for computing related entries). As another example, consider the Dvorak Simplified Keyboard (DSK) layout that arranges keys so that frequently used keys are easiest to select.

As an example, a keyboard can include a space bar key (e.g., located at a bottom portion of a keyboard for entry of spaces such as spaces between individual words). As an example, a keyboard can include a return key (e.g., a "carriage return" type of key) that may cause a line break such as to begin a new paragraph or to enter blank lines, etc. As an example, a keyboard can include a shift key. As an example, a keyboard can include a control key. As an example, a keyboard can include one or more keys that can be selected with one or more other keys (e.g., consider a shift key for entry of capitalized characters, etc.).

Figure 2:
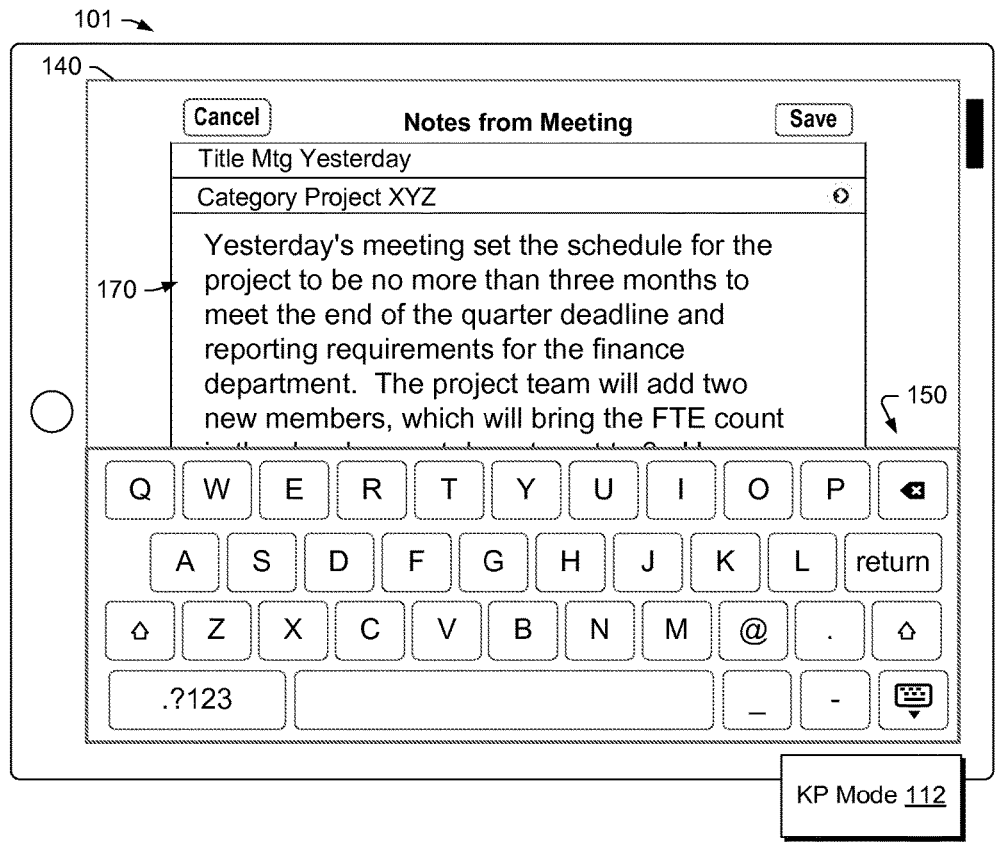
FIG. 2 is a diagram of an example of a scenario of the device of FIG. 1 and an example of a plot of states with respect to time.
Figure 2:
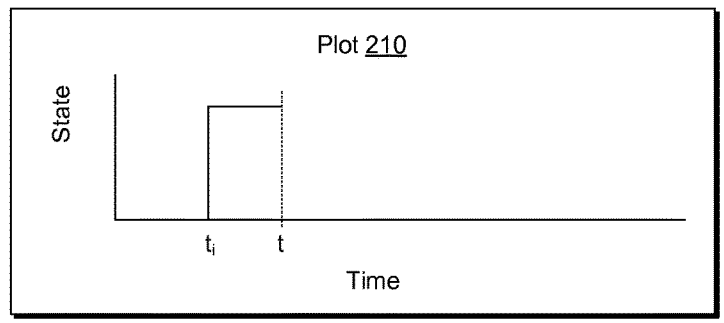

FIG. 2 shows the device 101 of FIG. 1 where the GUI 170 includes additional text and where the keypad 150 obscures a region of the GUI 170 that includes a portion of the text. FIG. 2 also shows a plot 210 of keypad state versus time where the keypad 150 is rendered at a time $t_i$ to be present in a state that occupies a block portion of the display 140 and where that state persists to a present time t.

For a user, the scenario of FIG. 2 may be deemed less than optimal as the user may not be able to see certain text that the user wishes to see, read, etc.

Figure 3:
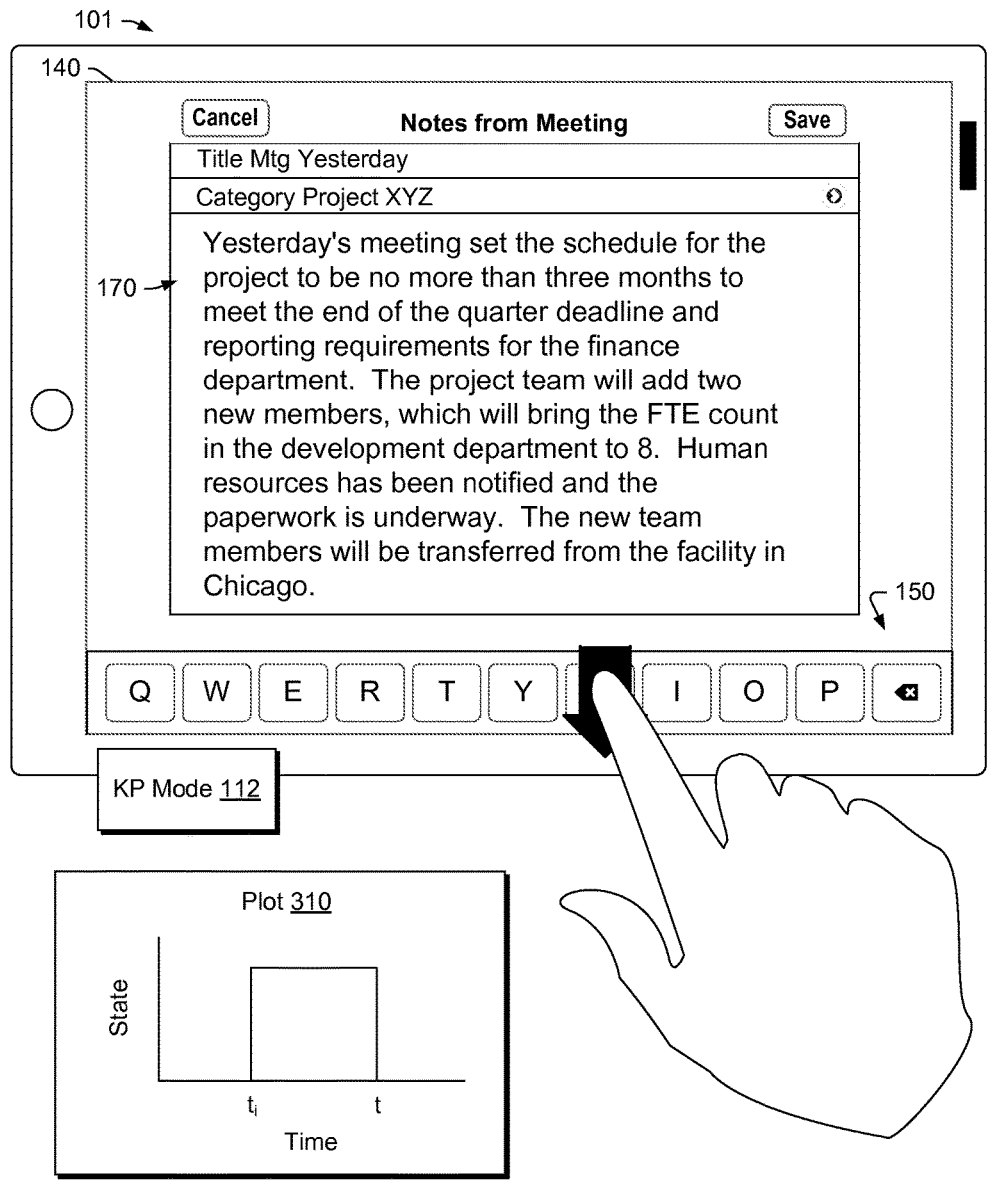
FIG. 3 is a diagram of an example of a scenario of the device of FIG. 1 and an example of a plot of states with respect to time.

FIG. 3 shows a scenario that follows from the scenario of FIG. 2 where a user may make a gesture (e.g., a downward swiping motion with a finger or fingers) to move the keypad 150 out of the way of the text in the GUI 170. In such an example, the keypad 150 may be rendered in a manner where it appears to translate downwardly or, for example, the keypad 150 may disappear entirely in response to input (e.g., a swipe, etc.). FIG. 3 also shows a plot 310 that follows from the plot 210 of FIG. 2 where a transition is shown in the state of the keypad 150 at a present time t, for example, a time that corresponds to input received that instructs the device 101 to change the state of the keypad 150 (e.g., from being present to being absent).

In the examples of FIG. 1, FIG. 2 and FIG. 3, where the device 101 operates in the keypad mode 112, additional user interaction may be input to control the keypad (e.g., whether it is rendered to the display 140 or not rendered to the display 140). For example, a gesture or gestures may be input to control the keypad 150 where such a gesture or gestures are not associated with selection of a key of the keypad 150. In essence, such a gesture or gestures may be "wasted" movements that are not directed to typing, etc. Wasted movements can take time and detract from a task or tasks being performed via a device.

As an example, the keypad module 110 of the device 101 can include another keypad mode. For example, the keypad module 110 of the device 101 can include a mode that can transition one or more properties of a keypad in response to detection of an object, which may be, for example, one or more properties associated with transparency of a keypad. In such an example, an object may be a finger, fingers, a hand, a stylus, an eye, eyes, etc. For example, the device 101 can include object detection circuitry. Object detection circuitry may be or include, for example, one or more of touch sensing circuitry of a touchscreen, field sensing circuitry of a digitizer, proximity sensing circuitry (e.g., IR detector, camera detector, etc.), eye-tracking circuitry, etc.

Figure 4:
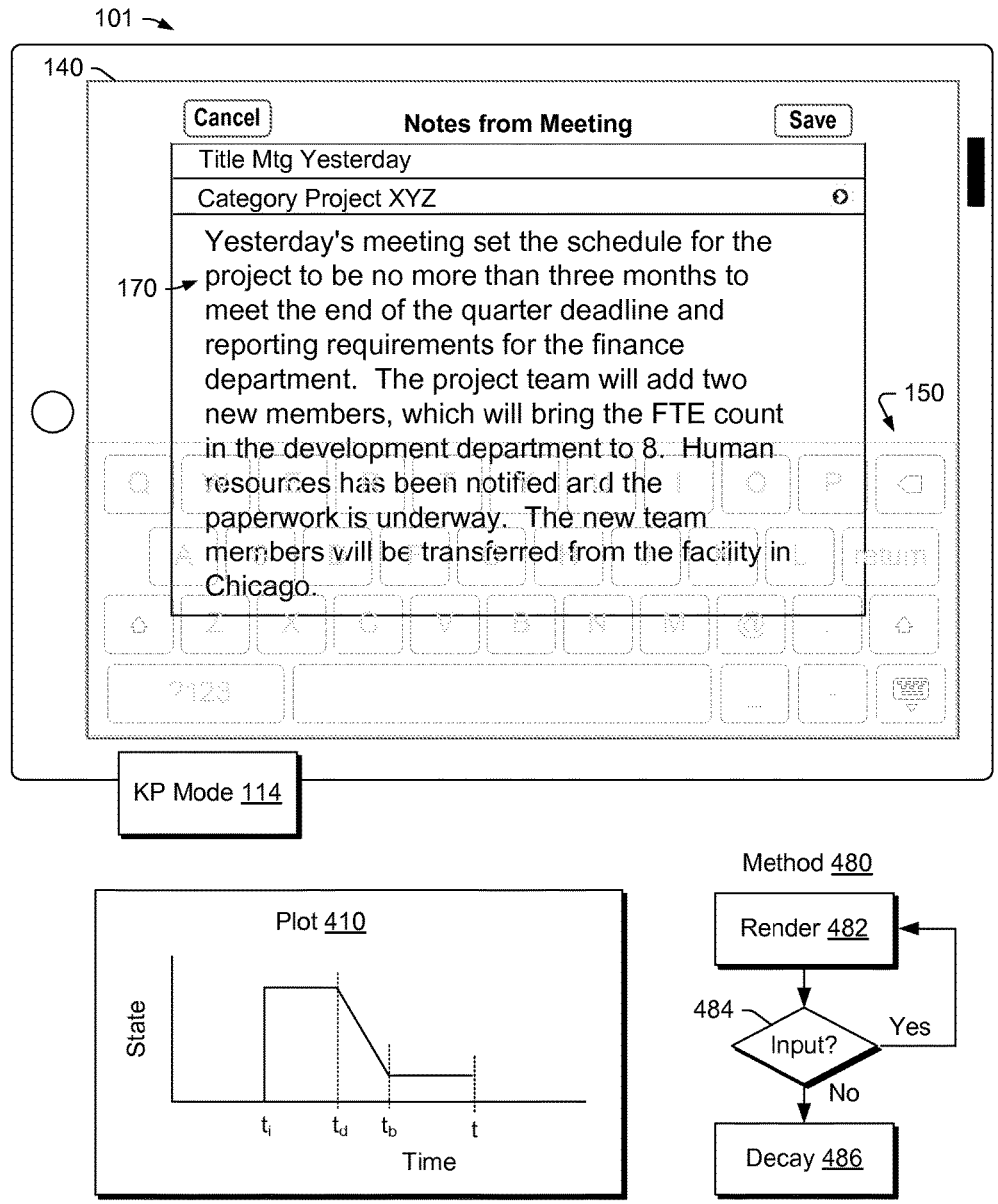
FIG. 4 is a diagram of an example of a scenario of the device of FIG. 1, an example of a plot of states with respect to time and an example of a method.

FIG. 4 shows the device 101 as operating in a keypad mode 114, which may be one of the keypad modes of the keypad module 110. FIG. 4 also shows a plot 410 where state transitions have occurred with respect to time for the keypad 150. In the example of FIG. 4, the states correspond to visibility of the keypad 150. For example, during the time period from $t_i$ to $t_d$, the keypad 150 is in a type of non-transparent state such as the state of the keypad 150 in the scenario of FIG. 2 where, for example, information (e.g., content) rendered to the display 140 is obscured by the keypad 150. As shown in the scenario of FIG. 2, the keypad 150 completely obscures text, which may be "rendered" to the display 140 but not visible, for example, due to a display setting (e.g., consider a z-buffer where the text is in a layer subordinate to a layer of the keypad 150).

As shown in the plot 410, at the time $t_d$, the keypad 150 starts to "decay" in that it transitions to a transitory state that arrives at a base state at time $t_b$. In the example of FIG. 4, the base state is a translucent state with a translucency level that allows at least a portion of information (e.g., content), which occupies a common region of the display 140 with the keypad 150, to be visible. In such a manner, a user may still perceive the keypad 150 (e.g., spatially) and see information that is "underneath" the keypad 150 (e.g., in a z-buffer sense).

FIG. 4 also shows an example of a method 480 that include a render block 482 for rendering information to a display and rendering a keyboard to the display, a decision block 484 for deciding whether input is received (e.g., within a time period) and a decay block 486 that causes the keyboard to "decay" as to its visibility if the decision block 484 decides that no input has been received in a period of time. As an example, a method may implement a linear decay and/or a nonlinear decay. For example, decay may commence slowly and increase as time passes until, for example, a base state is reached (e.g., which may be a state where the keyboard is still visible to some extent). As another example, a transition region may transition translucency (e.g., transparency levels) of a keypad (e.g., a keyboard) based at least in part on position of an object that may be detected. For example, the closer the detected object gets to a display, the less transparent a keypad becomes as rendered to the display. As an example, as a detected object increases its distances from a display, a keypad rendered to the display may increase in its transparency (e.g., from a less transparent level to a more transparent level). Where a detected object maintains a distance, as an example, a keypad may be rendered at a transparency level that corresponds to that distance. As an example, transparency level of a rendered keypad may depend at least in part on distance of a detected object from a display (e.g., consider distances in a range of about 0 cm to about 10 cm, which may optionally be an adjustable range via one or more settings). In such an example, a relationship may be linear, nonlinear, etc., for example, to provide a desired visual effect. As an example, a transition relationship for transitioning translucency may depend on one or more factors such as, for example, time, position of a detected object, distance of a detected object, number of detected objects (e.g., a finger or fingers, etc.), etc.

As to states of a keypad, such states may include time dependent states, transitory states, steady-states, etc. As an example, individual states of a keypad may include an associated visibility parameter. Such a parameter may be a transparency parameter, a translucency parameter, a screen door parameter, an alpha-compositing parameter, etc. As an example, a parameter may be part of a graphics processing algorithm, which may be associated with a graphics processing unit (e.g., a GPU) or other circuitry that can render information to a display.

As an example, a framework such as the OpenGL (Open Graphics Library) framework may be implemented for rendering information to a display. Such a framework includes an application programming interface (API) for rendering 2D and 3D vector graphics where, for example, the API may interact with a graphics processing unit (GPU).

In the OpenGL framework, a transparent physical material shows objects behind it as unobscured and does not reflect light off its surface. Clear glass may be considered to be a nearly transparent material. Although glass allows most light to pass through unobscured, in reality it also reflects some light. A perfectly transparent material is completely invisible (e.g., consider a transparency level of 100% transparent, etc.). In the OpenGL framework, a translucent physical material shows objects behind it, but those objects are obscured by the translucent material. In addition, a translucent material reflects some of the light that hits it, making the material visible. Physical examples of translucent materials include sheer cloth, thin plastic, and smoked glass.

Transparent and translucent may be used synonymously to the extent that they characterize a graphic such as, for example, a keypad and whether the keypad allows for information (e.g., content) to be visible and discernable to a user that views a display to which the information and the keypad are simultaneously rendered. Materials that are neither transparent nor translucent are opaque (e.g., consider a transparency level of 0% transparent, etc.).

As an example, a technique such as blending may be implemented for combining color (e.g., or grayscale) already in the frame buffer with the color (e.g., or grayscale) of the incoming primitive. The result of this combination may then be stored back in the frame buffer. As an example, blending may be used to simulate translucent physical materials. One example is rendering the smoked glass windshield of a car. The driver and interior are still visible, but they are obscured by the dark color of the smoked glass.

As an example, a technique that implements a blend feature of a framework may be used to create a transparency (e.g., with appropriate ordering of data to be rendered).

As an example, a technique referred to as a "screen door" technique may be implemented to create a transparent effect for a keypad rendered to a display with respect to information rendered at least in part in a common region as the keypad.

In the OpenGL framework, blending may be implemented as follows:
  glEnable (GL_BLEND);
  glBlendFunc (GL_SRC_ALPHA, GL_ONE_MINUS_SRC_ALPHA);

In such an example, after blending is enabled, an incoming primitive color can be blended with a color already stored in the frame buffer. In the foregoing example, the glBlendFunc( ) controls how such blending occurs. As an example, a technique can modify an incoming color by its associated alpha value and modifies the destination color by one minus the incoming alpha value. The sum of these two colors can then be written back into the frame buffer.

As an example, in the OpenGL framework, a primitive's opacity is specified using glColor4*( ) where, for example, RGB specifies the color, and the alpha parameter specifies the opacity. When a depth buffer is implemented, rendering order can be a factor that can control at least in part how information appears on a display. For example, with depth buffering enabled, fully opaque primitives can be rendered first, followed by partially opaque primitives, for example, in a back-to-front order.

As to a screen door technique, in the OpenGL frame work, such a technique can include specifying a polygon stipple pattern with glPolygonStipple( ) and by rendering the transparent primitive with polygon stippling enabled (glEnable (GL_POLYGON_STIPPLE)). In such an example, the number of bits set in the stipple pattern determines the amount of translucency and opacity; setting more bits result in a more opaque object, and setting fewer bits results in a more translucent object. A screen door transparency technique may be order independent (e.g., primitives do not necessarily need to be rendered in back-to-front order).

As an example, a device may implement a technique that can make a keypad be opaque or be translucent (e.g., or transparent). As an example, states of a keypad may be controlled via a mode or modes. For example, consider the module 110 of the device 101 as being capable of causing the device 101 to operate in one or more keypad modes (e.g., consider the mode 114). As an example, a keypad may include states that include corresponding levels of translucency or transparency. As an example, a keypad may include an opaque state and one or more translucent or transparent states. As an example, a device can include object detection circuitry that can issue a signal that calls for transitions a keypad from one state to another state. In such an example, the keypad may be spatially stationary with respect to a display area of a display. For example, a keypad may transition from an opaque state to a translucent state responsive to expiration of a timer (e.g., a time period) or from a translucent state to an opaque state responsive to detection of an object (e.g., a finger approach a display, touching a display, etc.).

Figure 5:
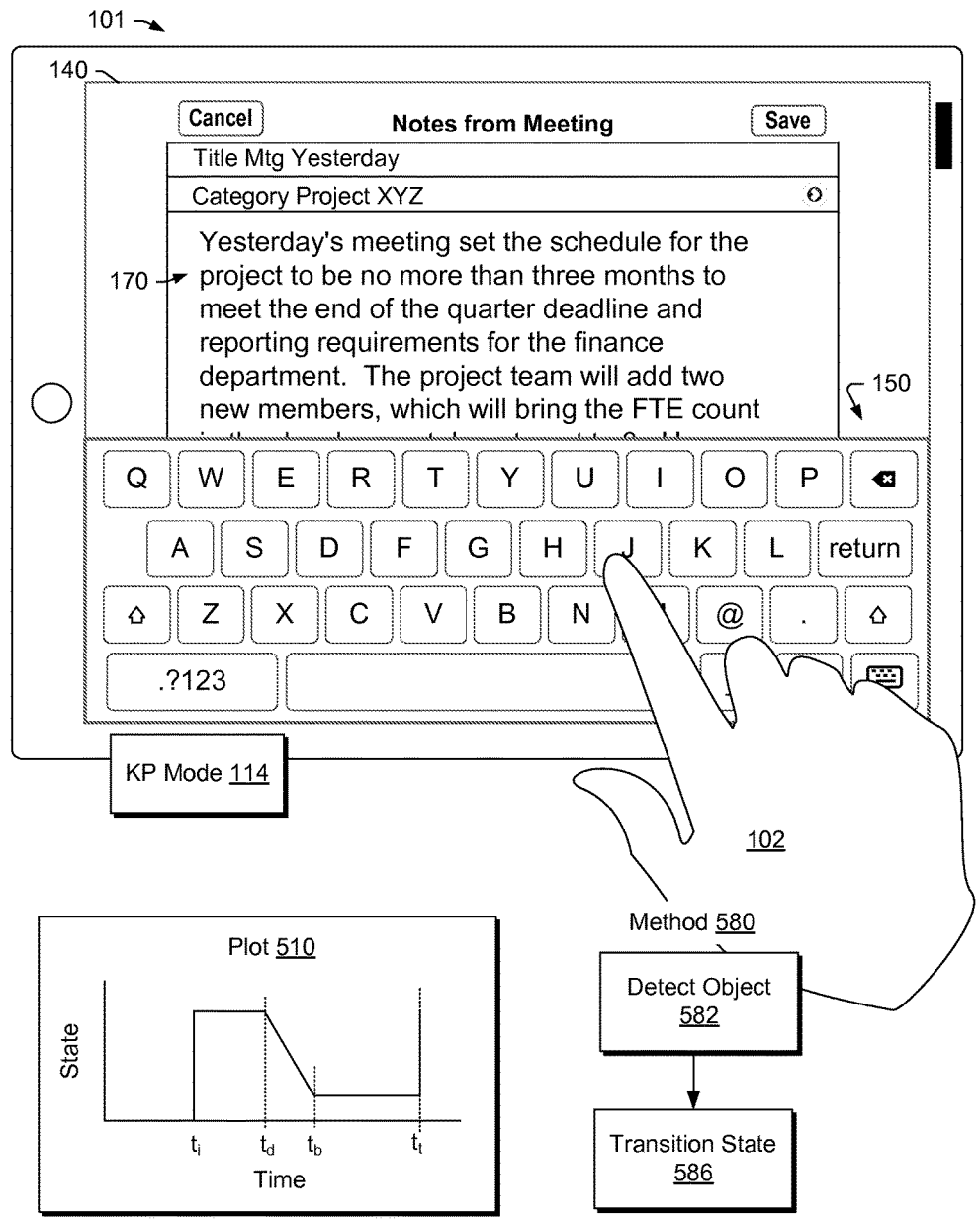
FIG. 5 is a diagram of an example of a scenario of the device of FIG. 1, an example of a plot of states with respect to time and an example of a method.

FIG. 5 shows an example scenario that may follow from the scenario of FIG. 4. As shown, an object 102 is in contact with the device 101 or in proximity to the device 101 such that the keypad mode 114 causes the device 101 to transition the state of the keypad 150. A plot 510 shows a state transition at time t, which may correspond to detection of the object 102. In such an example, the keypad 150 may be transitioned from a base state to an opaque state that may allow a user to readily perceive the keypad 150 for purposes of touching one or more keys.

FIG. 5 also shows an example of a method 580 that includes a detection block 582 for detecting an object and a transition block 586 for transitioning a state of a keyboard rendered to a display based at least in part on detecting the object. For example, as illustrated in the plot 510, the keyboard 150 may be rendered to the display 140 in a base state at an initial transparency level (e.g., an initial translucency level) and may be transitioned to a different state at a time when an object is detected (e.g., time~t).

As an example, a method can include rendering a keyboard at a first transparency level to a touch sensitive display; detecting an object proximate to the touch sensitive display; and responsive to the detecting, rendering the keyboard at a second transparency level that differs from the first transparency level. For example, as illustrated in the plot 510, a first transparency level for the keyboard 150 may optionally be a base level associated with a base state and, upon detecting an object such as the object 102, the device 101 may render the keyboard 150 at a second transparency level that may correspond to a touch input state where the keyboard 150 is more visible (e.g., less transparent or less translucent) when rendered at the second transparency level. As an example, such a method may operate in conjunction with a method such as the method 480 of FIG. 4. In such an example, various transitions may occur as to transparency of a keyboard.

Figure 6:
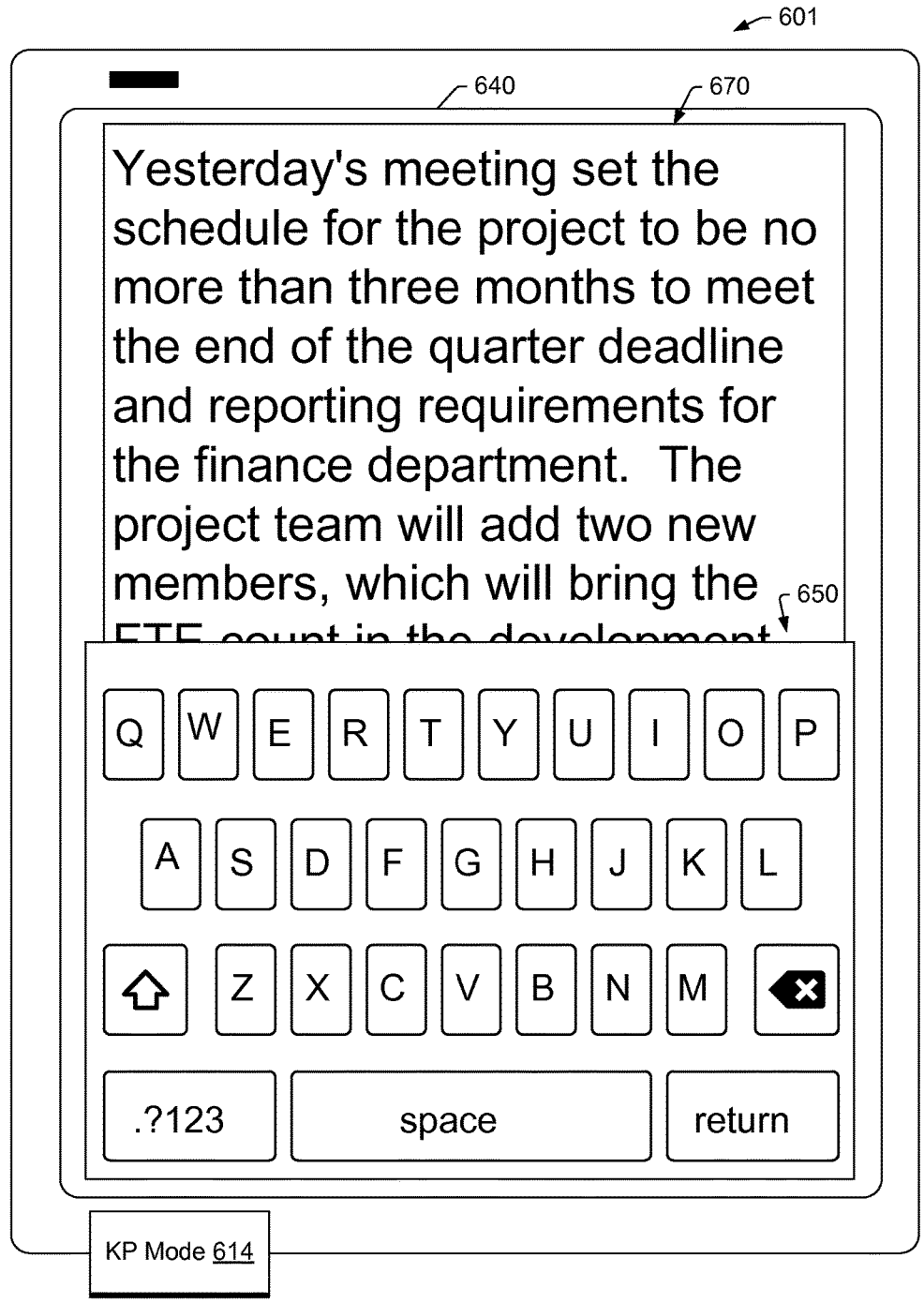
FIG. 6 is a diagram of an example of a device with respect to an example of a scenario.

FIG. 6 shows an example scenario of an example of a device 601 that operates in a keypad mode 614, for example, according to a keypad module such as the module 110 of the device 101 of FIG. 1. In the example of FIG. 6, a keypad 650 is rendered to a display 640 (e.g., a touch sensitive display) of the device 601 and information in a GUI 670 is obscured by the keypad 650.

Figure 7:
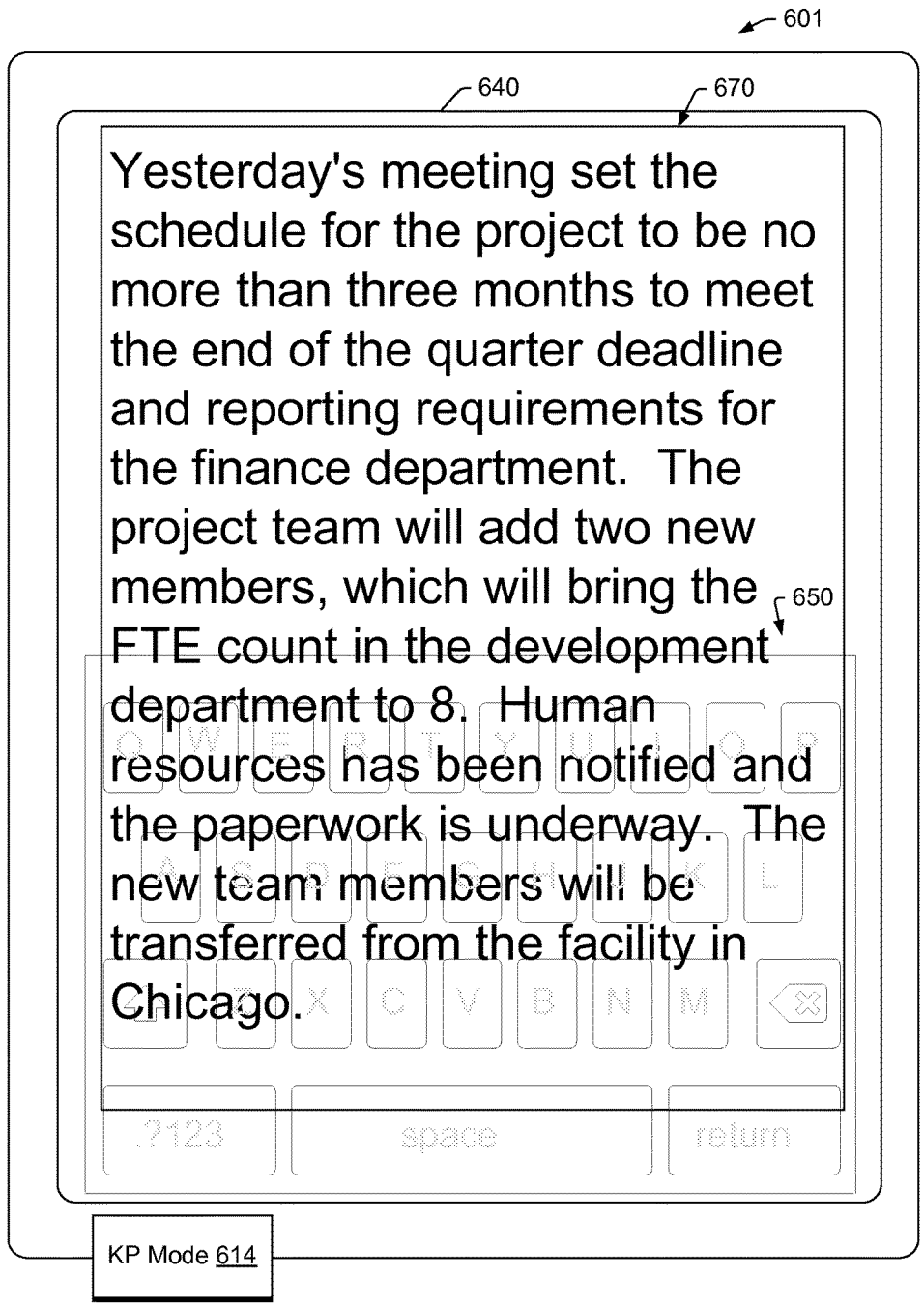
FIG. 7 is a diagram of the device of FIG. 6 with respect to an example of a scenario.

FIG. 7 shows an example scenario that may follow from the scenario of FIG. 6. For example, the device 601 may issue a signal that causes a state transition of the keypad 650. As an example, such a signal may be caused by expiration of a time period, via tracking of eye movement, etc. For example, where eye tracking circuitry detects eye gaze to a region of the display 640 that includes the keypad 650, the device 601 may transition the keypad 650 from an opaque state to a translucent state. In such an example, object detection circuitry may also indicate that an object such as a finger, a stylus, etc. is not proximate or in contact with the display 640, which may act as an indicator that the eye gaze is associated with an intent to view content that may be otherwise obscured by the keypad 650.

Figure 8:
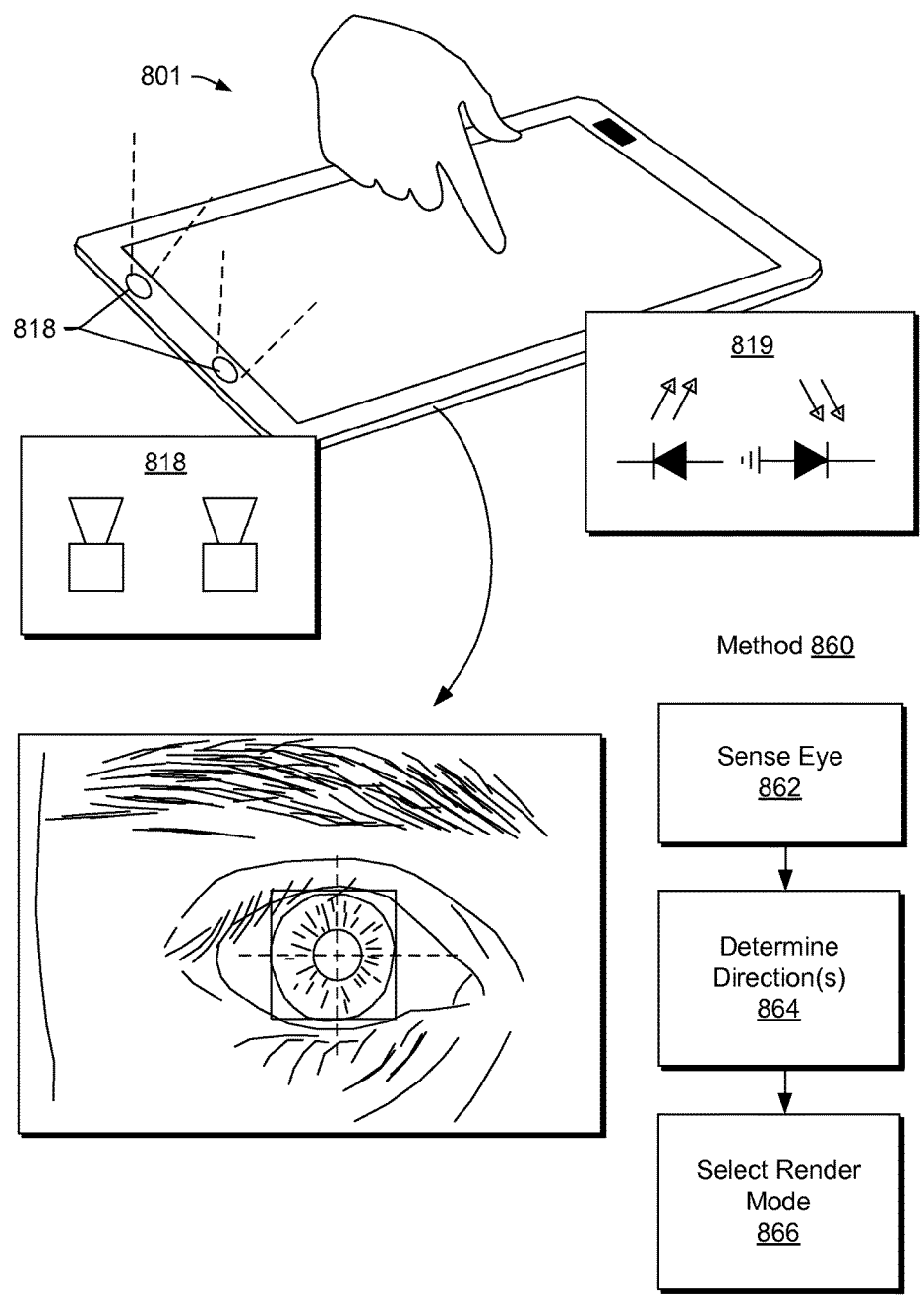
FIG. 8 is a diagram of an example of a device and an example of a method.

FIG. 8 shows an example of a device 801 that includes one or more sensors 818 for sensing information. As an example, the one or more sensors 818 may be cameras. As an example, a device such as the device 801 may include one or more emitters and one or more detectors 819. As an example, a device can include at least one sensor that can detect an object or objects. For example, consider a sensor that can detect a finger, a stylus, etc. As an example, a sensor may detect an eye or eyes.

In the example of FIG. 8, the device 801 may sense information related to the eye or eyes. For example, the one or more sensors 818 may include an eye tracking sensor (see, e.g., approximate illustration of an eye locating mechanism). As an example, an eye tracking sensor may be eye tracking circuitry and may be object detection circuitry in that it can detect an eye or eyes.

As shown in FIG. 8, a method 860 can include a sense block 862 for sensing an eye, a determination block 864 for determining a direction or directions based at least in part on sensing the eye or eyes, and a selection block 866 for selecting a render mode for the device 801 based at least in part on one or more eye-related determinations.

As an example, the device 801 may include circuitry that can implement an algorithm that may include capturing an image and analyzing the image for indicia of an eye (e.g., an iris, a pupil, etc.). In such an example, the analysis may indicate a gaze direction for the eye. As an example, such a method may include eye tracking, for example, by acquiring multiple images (e.g., successively) and analyzing each of the images to determine whether a pupil (e.g., eye gaze) has changed with respect to time.

Figure 9:
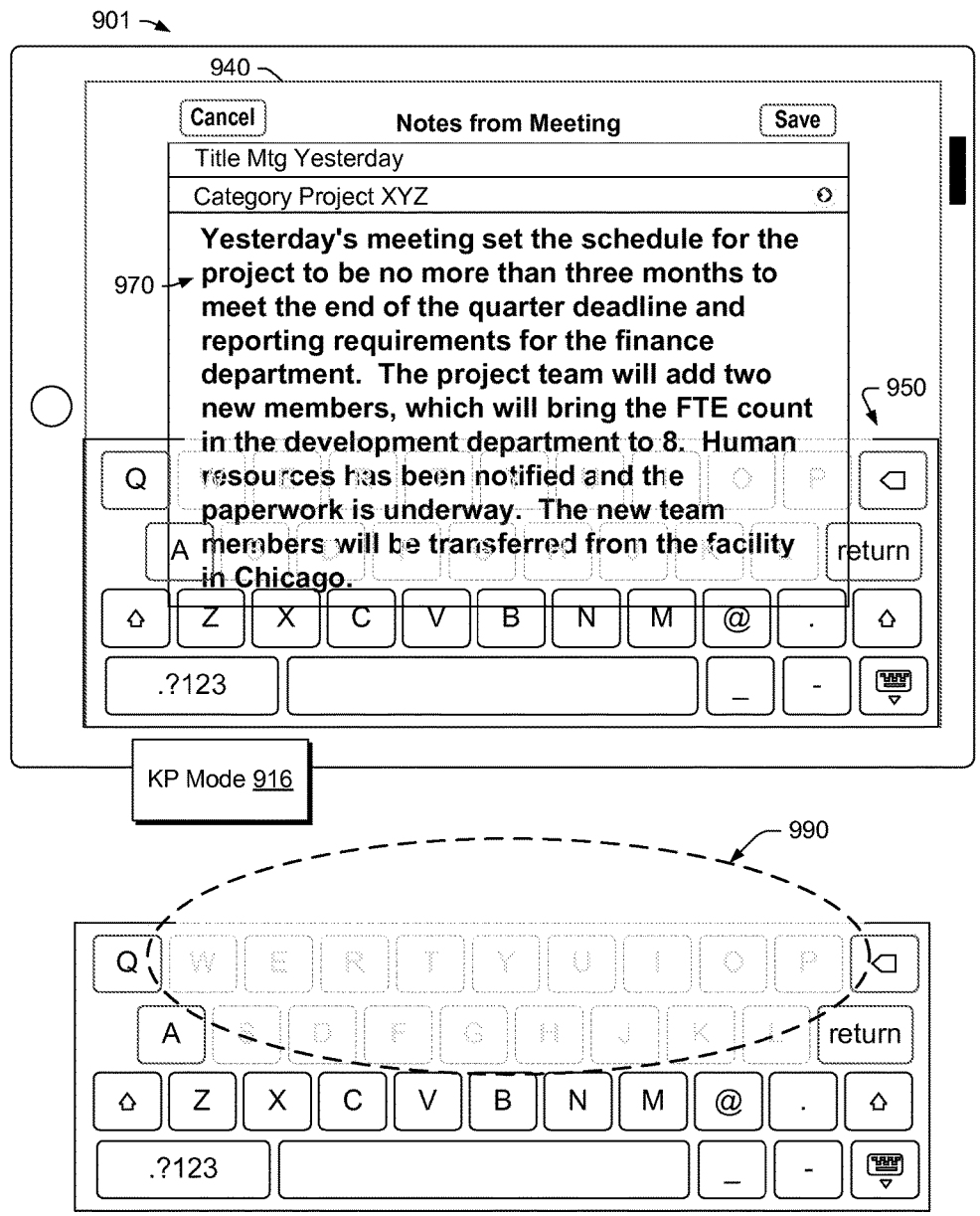
FIG. 9 is a diagram of an example of a device.

FIG. 9 shows an example scenario of an example of a device 901 that operates in a keypad mode 916, for example, according to a keypad module such as the module 110 of the device 101 of FIG. 1. In the example of FIG. 9, a keypad 950 is rendered to a display 940 (e.g., a touch sensitive display) of the device 901 and information in a GUI 970 is visible via a translucent portion of the keypad 950, which may be, for example, a transparent portion (e.g., completely transparent).

In the example of FIG. 9, the keypad mode 916 may operate in conjunction with eye tracking circuitry (see, e.g., FIG. 8), which may be part of the device 901 and/or operatively coupled to the device 901. As shown in FIG. 9, a field of view 990 may be determined based at least in part on information from eye tracking circuitry. In response, the device 901 may render a portion of the keypad 950 in a state that differs from another portion of the keypad 950. For example, a portion of the keypad 950 may be in a "see through" state such that a user may see content that may otherwise be obscured by the keypad 950. As an example, a border of the field of view 990 may be a gradient border where transparency decreases moving outwardly from a center of the field of view (e.g., or centers of fields of view, which may overlap as in a binocular type of field of view that may be represented by overlapping circles, ovals, etc.).

Figure 10:
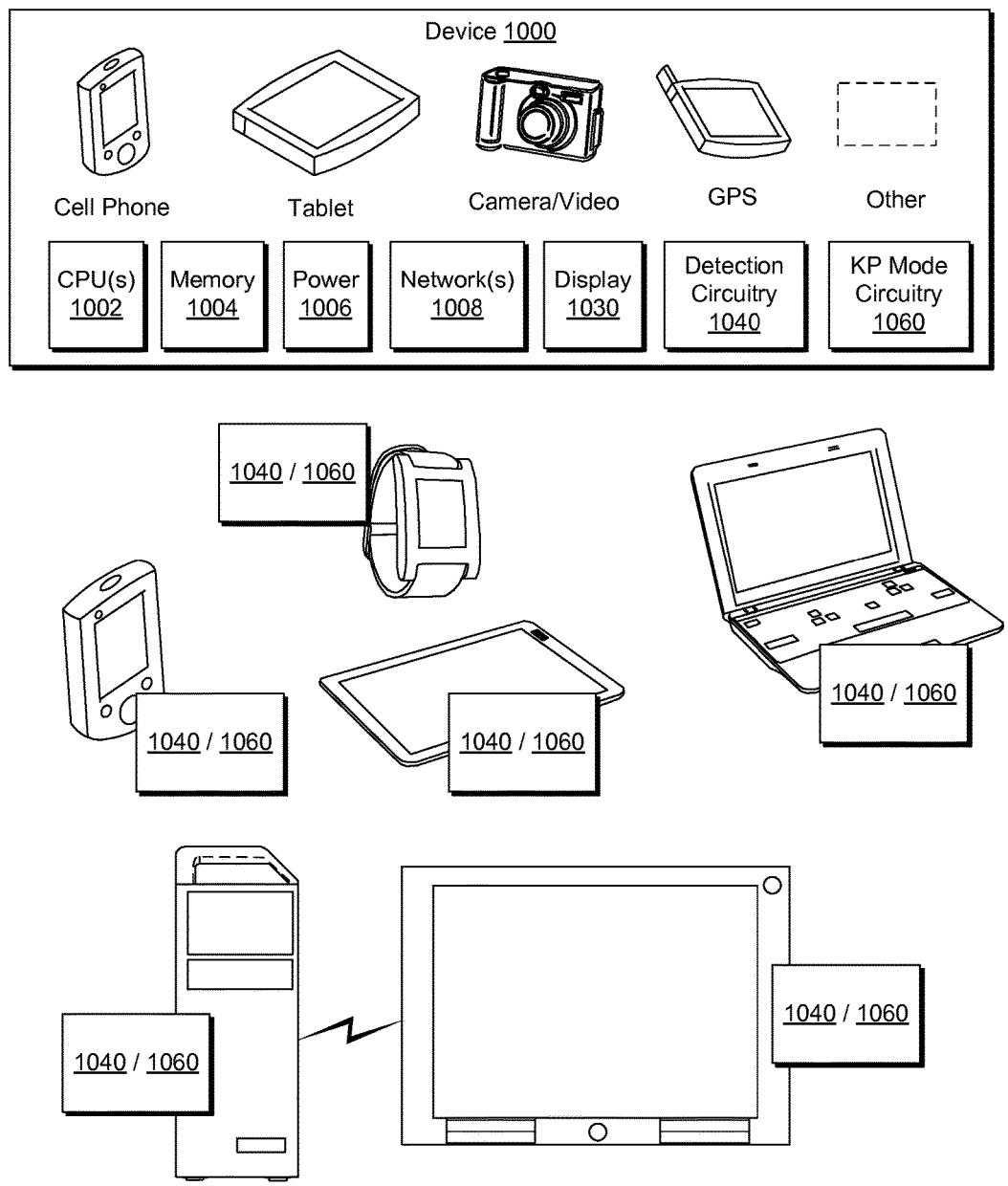
FIG. 10 is a diagram of examples of devices.

FIG. 10 shows an example of a device 1000 that may include detection circuitry 1040 and keypad mode circuitry 1060. As shown, the device 1000 may be configured, for example, as a watch, a phone, a tablet, a notebook, a desktop system, a camera, a GPS device or other device.

As an example, the device 1000 may include one or more processors 1002, memory 1004, a power source 1006, one or more network interfaces 1008 (e.g., including one or more cell network interfaces, etc.), a display 1030 (e.g., or displays) with associated display circuitry (e.g., for rendering, touch sensing, etc.), detection circuitry 1040 and keypad mode circuitry 1060.

As an example, an apparatus can include a processor; memory accessibly by the processor; a display operatively coupled to the processor; an object detector operatively coupled to the processor; display circuitry that controls transparency of a rendered keyboard based at least in part on input sensed via the object detector. In such an example, the object detector may be, for example, a touchscreen, a proximity sensor or sensors, an eye tracker or trackers.

As an example, display circuitry can decrease transparency of a rendered keyboard based at least in part on the touch input sensed via the touch sensitive display. As an example, display circuitry may control transparency of a rendered keyboard via alpha compositing. In such an example, an alpha parameter may be capable of taking on a value in a range of values that correspond to levels of transparency. As an example, display circuitry may control transparency of the rendered keyboard via a screen dooring.

As an example, display circuitry may selectively render a keyboard to an area of a touch sensitive display responsive to receipt of a keyboard display command. In such an example, the rendered keyboard may have an initial transparency, which may, for example, depend on at least one characteristic of content rendered to the touch sensitive display.

As an example, a method can include rendering a keyboard at a first transparency level to a touch sensitive display; sensing a touch that corresponds to a key of the keyboard; responsive to the touch, rendering the keyboard at a second transparency level that is less than the first transparency level; and upon expiration of a timer, rendering the keyboard at the first transparency level. Such a method may include rendering content to an area of the touch sensitive display where an area of the keyboard overlays at least a portion of the area of the content. As an example, content may include one or more of text, graphics, images, video, etc.

As an example, a method may include initiating a timer where the timer commences after release of a sensed touch. In such an example, the timer may have a time greater than approximately 10 ms and less than approximately three seconds. As an example, a timer may correspond to a duration of sensed touch.

As an example, an apparatus can include a processor; memory accessibly by the processor; a touch sensitive display operatively coupled to the processor; object detection circuitry; and display circuitry that selectively renders a keyboard to the touch sensitive display and that controls transparency of the rendered keyboard based at least in part on input sensed via the object detection circuitry. In such an example, the display circuitry can decrease transparency of the rendered keyboard based at least in part on the input sensed via the object detection circuitry.

As an example, object detection circuitry can include one or more of a camera, an emitter and a detector (e.g., an infrared emitter and an infrared detector), etc.

As an example, a method can include rendering a keyboard at a first transparency level to a display; detecting an object; and responsive to the detecting, rendering the keyboard at a second transparency level that differs from the first transparency level. In such a method, sensing can include sensing the object moving toward the touch sensitive display. In such a scenario, the second transparency level can be less than the first transparency level. As an example, a method can include sensing an object moving away from a touch sensitive display. In such a scenario, a second transparency level can be greater than a first transparency level.

As an example, an apparatus can include a processor; memory accessibly by the processor; a touch sensitive display operatively coupled to the processor; eye tracking circuitry; display circuitry that selectively renders a keyboard to the touch sensitive display and that controls transparency of the rendered keyboard based at least in part on input sensed via the eye tracking circuitry. As an example, an apparatus may render content to a top region of a display and a keyboard to a lower region of the display and, when eyes move down as sensed via eye tracking circuitry, the apparatus may alter the keyboard transparency (e.g., and/or vice versa).

As an example, display circuitry can control transparency for an area of a keyboard that is less than a total area of the keyboard. For example, consider an area that includes a border. As an example, a transparency gradient may border an area. As an example, size of an area can correspond to at least one eye tracking parameter. As an example, display circuitry can move an area based at least in part on input sensed via eye tracking circuitry.

As an example, a method can include rendering a keyboard at a transparency level to a touch sensitive display; rendering content to the touch sensitive display; tracking eye movement with respect to at least a portion of the content; and controlling the transparency level for at least a portion of the keyboard based at least in part on the tracking eye movement. In such an example, the method may include increasing the transparency level for an area of the keyboard that overlays an area of the content. As an example, a method can include controlling transparency for an area of a keyboard and moving the area based at least in part on tracking eye movement.

As an example, an apparatus can include a processor; memory accessibly by the processor; a display operatively coupled to the processor; an object detector operatively coupled to the processor; and display circuitry that controls transparency of a rendered keyboard based at least in part on input sensed via the object detector. In such an example, the display can be or include a touchscreen display and, for example, the object detector may include or be operatively coupled to touch sensing circuitry of the touchscreen display.

As an example, an object detector may include a camera. As an example, an object detector may include an emitter and a detector, for example, consider an electromagnetic energy emitter and an electromagnetic energy detector (e.g., IR or other type). As an example, an object detector can include eye tracking circuitry.

As an example, display circuitry can decrease transparency of a rendered keyboard based at least in part on input sensed by the object detector where the input corresponds to detection of an object.

As an example, display circuitry may control transparency of a rendered keyboard via alpha compositing. As an example, display circuitry may control transparency of a rendered keyboard via a screen dooring.

As an example, display circuitry may selectively render a keyboard to an area of a display responsive to receipt of a keyboard display command.

As an example, a rendered keyboard can include an initial transparency where the initial transparency of the keyboard depends on at least one characteristic of content rendered to a display (e.g., text content, graphics content, image content, video content, etc.).

As an example, a method can include rendering a keyboard at a first transparency level to a display; detecting an object; and responsive to the detecting, rendering the keyboard at a second transparency level that differs from the first transparency level. In such an example, detecting can include detecting the object moving toward the display and where the second transparency level is less than the first transparency level (e.g., to make the keyboard more visible). As an example, a method can include detecting an object moving away from a display where a second transparency level is greater than a first transparency level (e.g., to make a keyboard less visible).

As an example, a method can include rendering content to an area of a display where an area of a keyboard overlays at least a portion of the area of the content. In such a method, the content can include one or more of text, graphics, images and video. As an example, a method can include tracking eye movement with respect to at least a portion of content and controlling a transparency level for at least a portion of a keyboard based at least in part on the tracking eye movement. In such an example, the method can include increasing the transparency level for an area of the keyboard that overlays an area of the content (e.g., making that area more transparent or "see through").

As an example, one or more computer-readable storage media, which are not transitory and that are not a carrier wave, can include processor-executable instructions to instruct a computing device where the instructions include instructions to: render a keyboard at a first transparency level to a display; detect an object; and, responsive to the detection of an object, render the keyboard at a second transparency level that differs from the first transparency level. As an example, instructions may be included to implement a time-based decay function that may be implemented, for example, after expiration of a time period, where the time-based decay function increases the transparency of a rendered keyboard with respect to time.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 11:
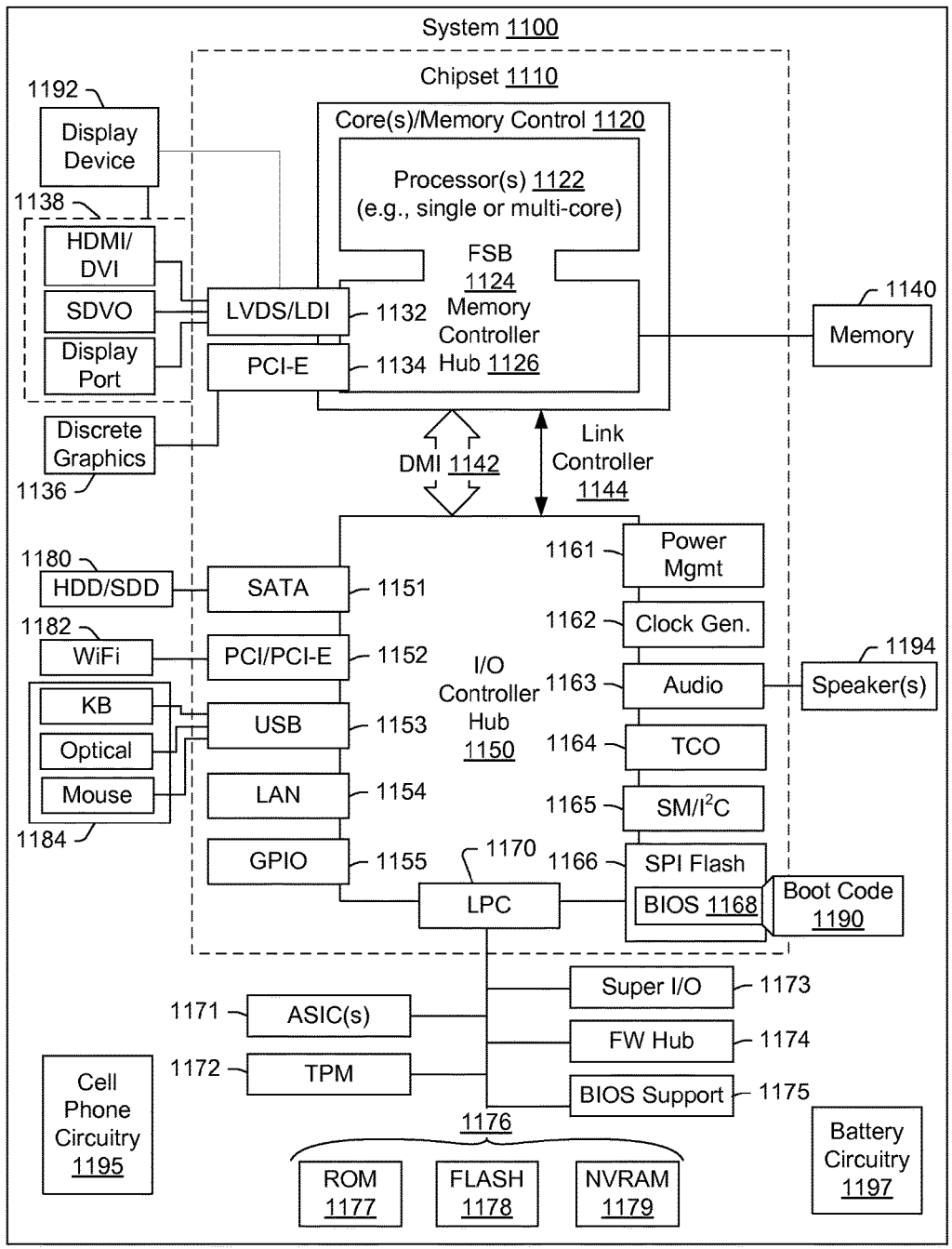
FIG. 11 is a diagram of an example of a system.

While various examples of circuits or circuitry have been discussed, FIG. 11 depicts a block diagram of an illustrative computing system 1100. As an example, the system 1100 may be a system of components that may be included in a device. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As described herein, a device (see, e.g., the device 101, the device 601, the device 901, etc.) may include at least some of the features of the system 1100.

As shown in FIG. 11, the system 1100 includes a so-called chipset 1110. A chipset refers to a group of integrated circuits, or chips, that are designed to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture. As an example, a chipset may be configured as a platform controller hub (PCH), for example, the memory controller hub (MCH) 1126 may be considered a northbridge and the I/O controller hub (ICH) 1150 may be considered a southbridge where the MCH 1126 and the ICH 1150 may be components of the platform controller hub (PCH) (e.g., a PCH architecture).

As shown in FIG. 11, the memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory". As an example, one or more processors may include circuitry for memory access, for example, to access system memory.

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics (e.g., rendering of graphics to a display, etc.).

The I/O controller hub 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O controller hub 1150 may include integrated gigabit Ethernet controller lines multiplexed with a PCI-E interface port. Other network features may operate independent of a PCI-E interface.

The interfaces of the I/O controller hub 1150 provide for communication with various devices, networks, etc. For example, the SATA interface 1151 provides for reading, writing or reading and writing information on one or more drives 1180 such as HDDs, SDDs or a combination thereof. The I/O controller hub 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, a touchpad, mice and various other devices (e.g., cameras, phones, storage, media players, etc.). On or more other types of sensors may optionally rely on the USB interface 1153 or another interface (e.g., $I^2C$, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168.

Again, as described herein, a satellite, a base, a server or other machine may include fewer or more features than shown in the system 1100 of FIG. 11. Further, the system 1100 of FIG. 11 is shown as including cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
memory accessibly by the processor;
a display operatively coupled to the processor;
an object detector operatively coupled to the processor; and
display circuitry that renders content to the display, that renders a keyboard to the display at a first transparency level, that, based at least in part on input sensed via the object detector and the existence of at least a portion of the content underneath an area of the rendered keyboard, increases transparency of the area of the rendered keyboard from the first transparency level to a second transparency level to unobscure the at least a portion of the content wherein another area of the rendered keyboard is maintained at the first transparency level, where the at least a portion of the content no longer exists in the area of the keyboard, that decreases transparency of the area of the keyboard, and, based at least in part on input sensed via the object detector that indicates that an object is approaching the rendered keyboard, that decreases transparency of the area of the rendered keyboard.

2. The apparatus of claim 1 wherein the display comprises a touchscreen display and wherein the object detector comprises touch sensing circuitry of the touchscreen display.

3. The apparatus of claim 1 wherein the object detector comprises a camera.

4. The apparatus of claim 1 wherein the object detector comprises an emitter and a detector.

5. The apparatus of claim 4 wherein the emitter comprises an electromagnetic energy emitter and wherein the detector comprises an electromagnetic energy detector.

6. The apparatus of claim 1 wherein the object detector comprises eye tracking circuitry.

7. The apparatus of claim 1 wherein the display circuitry controls transparency of the rendered keyboard via alpha compositing.

8. The apparatus of claim 1 wherein the display circuitry controls transparency of the rendered keyboard via screen dooring.

9. The apparatus of claim 1 wherein the display circuitry selectively renders the keyboard to the display responsive to receipt of a keyboard display command.

10. The apparatus of claim 1 wherein the first transparency level of the keyboard depends on at least one characteristic of content rendered to the display.

11. The apparatus of claim 1 wherein the display circuitry comprises circuitry that, based at least in part on input sensed via the object detector that indicates that an object is moving away from the rendered keyboard, increases transparency of the area of the rendered keyboard.

12. A method comprising:
rendering content to an area of a display;
rendering a keyboard at a first transparency level to the display wherein an area of the keyboard that is less than a total area of the keyboard overlays at least a portion of the area of the content;
detecting an object that is moving away from the keyboard rendered to the display;
responsive to the detecting and existence of the content in the area of the keyboard, rendering the area of the keyboard at a second transparency level that is greater than the first transparency level while maintaining another area of the keyboard at the first transparency level; and
responsive to the content no longer existing in the area of the keyboard, rendering the area of the keyboard at a transparency level that is less than the second transparency level.

13. The method of claim 12 wherein the content comprises at least one member selected from a group consisting of text, graphics, images and video.

14. The method of claim 12 further comprising tracking eye movement with respect to at least a portion of the content and controlling the transparency level for at least a portion of the keyboard based at least in part on the tracking eye movement.

15. The method of claim 14 wherein the controlling comprises increasing the transparency level for at least a portion of the area of the keyboard that is less than a total area of the keyboard that overlays an area of the content.

16. One or more non-transitory computer-readable storage media comprising processor-executable instructions to instruct a computing device wherein the instructions comprise instructions to:
render content to an area of a display;
render a keyboard at a first transparency level to the display wherein an area of the keyboard that is less than a total area of the keyboard overlays at least a portion of the area of the content;
detect an object that is moving away from the keyboard rendered display;
responsive to the detection of an object and existence of content in the area of the keyboard, render the area of the keyboard at a second transparency level that is greater than the first transparency level wherein another area of the keyboard is maintained at the first transparency level; and
where the content no longer exists in the area of the keyboard, decrease transparency of the area of keyboard.

17. The one or more non-transitory computer-readable storage media of claim 16 further comprising instructions to implement a time-based decay function after expiration of a time period wherein the time-based decay function increases the transparency of the rendered keyboard with respect to time.

* * * * *